United States Patent [19]

Goldman

[11] Patent Number: 5,317,833
[45] Date of Patent: Jun. 7, 1994

[54] LAWN AND FLOWER BED EDGING

[76] Inventor: Robert I. Goldman, 6658 Cibola Rd., San Diego, Calif. 92120

[21] Appl. No.: 944,420

[22] Filed: Sep. 14, 1992

[51] Int. Cl.$^5$ .................................................. A01G 1/00
[52] U.S. Cl. .......................................... 47/33; 52/102; 404/7
[58] Field of Search .................. 47/33; 52/102, 586, 52/585; 404/7

[56] References Cited

U.S. PATENT DOCUMENTS

| | | | |
|---|---|---|---|
| D. 182,124 | 2/1958 | Kearney | 52/102 |
| 789,207 | 5/1905 | Cook | 52/586 |
| 1,743,492 | 1/1930 | Sipe | 52/586 |
| 3,545,128 | 12/1970 | Fontaine | 52/585 |
| 3,572,224 | 3/1971 | Perry | 52/586 |
| 3,636,829 | 1/1972 | Palmer | 404/7 |
| 3,762,113 | 10/1973 | O'Mullan | 52/102 |
| 4,869,018 | 9/1989 | Scales | 47/33 |
| 4,945,675 | 8/1990 | Kendrick | 47/33 |
| 5,092,076 | 3/1992 | Terreta | 47/33 |

FOREIGN PATENT DOCUMENTS

| | | | |
|---|---|---|---|
| 587195 | 9/1931 | Fed. Rep. of Germany | 47/33 |
| 2837126 | 2/1980 | Fed. Rep. of Germany | 47/33 |
| 2945292 | 5/1981 | Fed. Rep. of Germany | 47/33 |
| 110004 | 6/1964 | Netherlands | 47/33 |
| 652565 | 11/1985 | Switzerland | 47/33 |

*Primary Examiner*—Henry E. Raduazo
*Attorney, Agent, or Firm*—Henri J. A. Charmasson; John D. Buchaca

[57] ABSTRACT

Imitation bricks made of molded plastic are linked by hinged connectors to form edging strips for flower beds, lawns or garden paths. Compressible rectangular washers between the bricks simulate mortar joints. Anchoring prongs with barbed tips are used to implant the blocks into the soil.

12 Claims, 3 Drawing Sheets

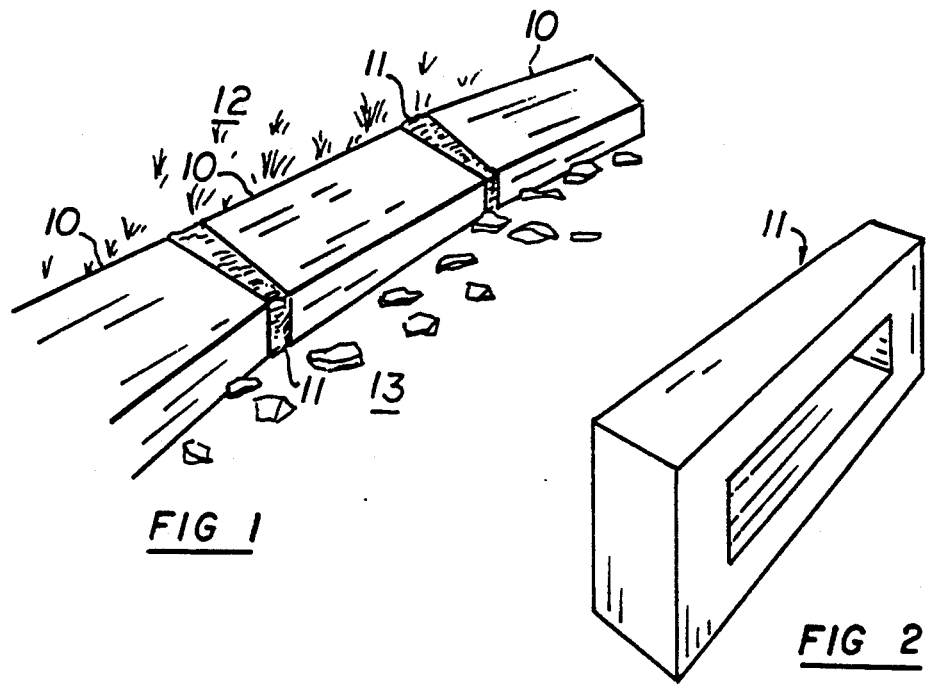
FIG 1
FIG 2
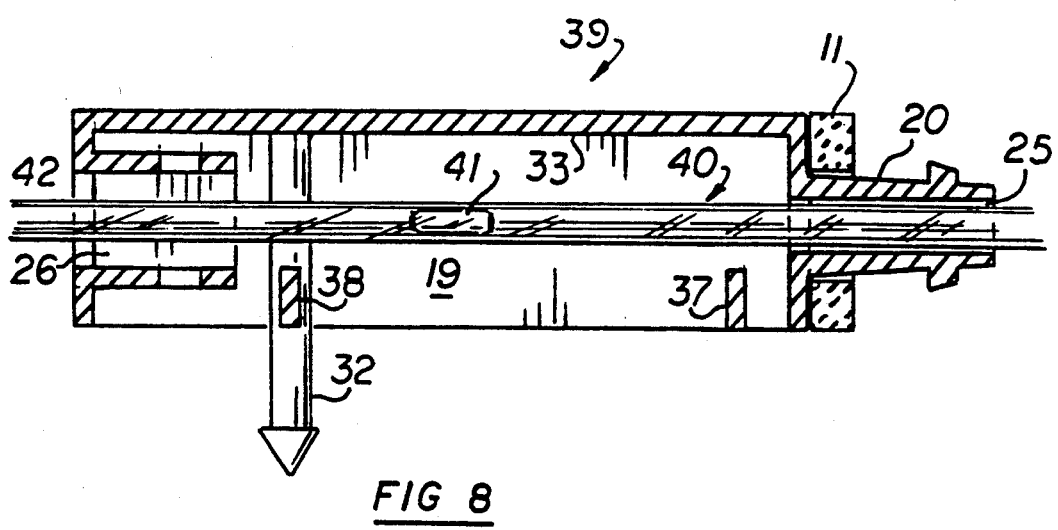
FIG 8

LAWN AND FLOWER BED EDGING

FIELD OF THE INVENTION

This invention relates to building blocks, and more specifically to substitutes for masonry blocks used in forming edgings for flower beds, lawns and the like.

BACKGROUND OF THE INVENTION

In the landscaping arts, it is customary to delineate flower beds, lawns and pathways with masonry edgings made from a series of bricks, masonry blocks or a combination of edging elements cast out of cement. The installation of those types of edgings requires considerable time and a variety of building elements, as well as some masonry skill.

There is a need for a more efficient medium for creating effective and esthetically pleasant borders between flower beds, lawns and garden paths.

SUMMARY OF THE INVENTION

The principal and secondary objects of this invention are to provide a simple, basic building element which can be used to quickly and conveniently form borders around flower beds, lawns and along garden pathways without the use of special tools or any masonry skill.

These and other objects are achieved by imitation brick elements made of molded plastic which can be hingedly interconnected with a series of similar blocks to form sinuous sections of edging which closely resemble those made from additional bricks. Each block element has a pair of anchoring prongs that facilitates its positioning and retention into and over any penetrable surface.

BRIEF DESCRIPTION OF THE DRAWING

FIG. 1 is a perspective view of a series of blocks forming a lawn edging;

FIG. 2 is a perspective view of a joint washer;

FIG. 8 is a cross-sectional view of a block equipped with internal lighting;

DESCRIPTION OF THE PREFERRED EMBODIMENTS OF THE INVENTION

Figure 3:
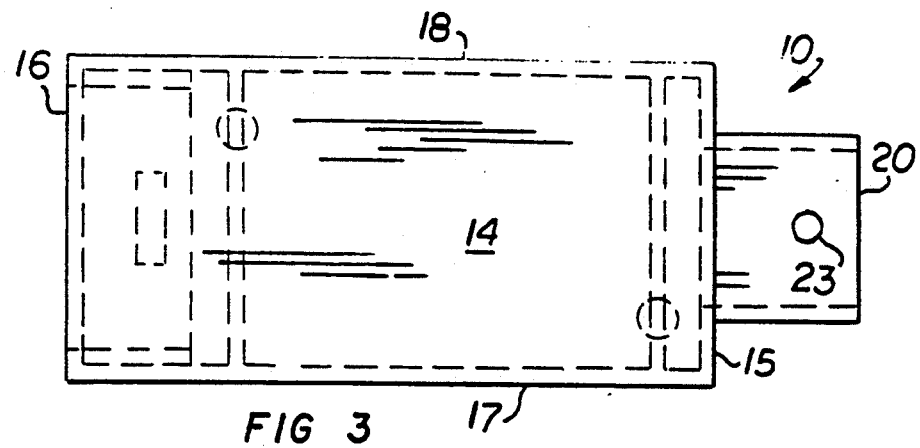
FIG. 3 is a top plan view of a block.

Referring now to the drawing, there is shown in FIG. 1 a section of a series of blocks 10 separated by joint-washers 11 according to the invention, forming an edging between a lawn area 12 and a garden path area 13.

Figure 4:
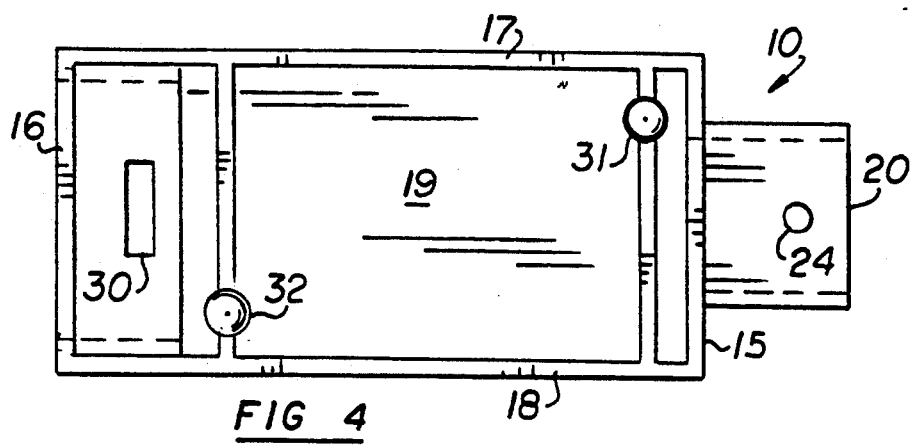
FIG. 4 is a bottom plan view thereof.
Figure 5:
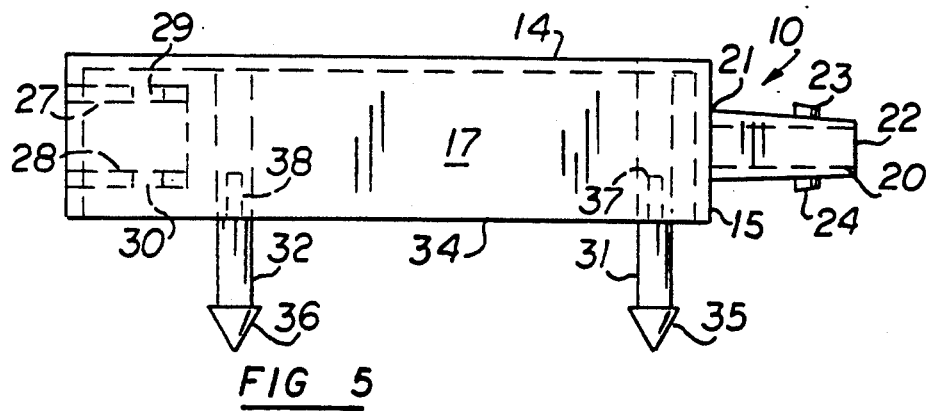
FIG. 5 is a elevational front view thereof.
Figure 6:
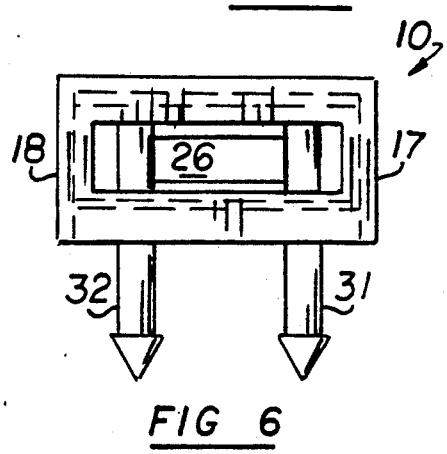
FIG. 6 is a left side elevational view thereof.
Figure 7:
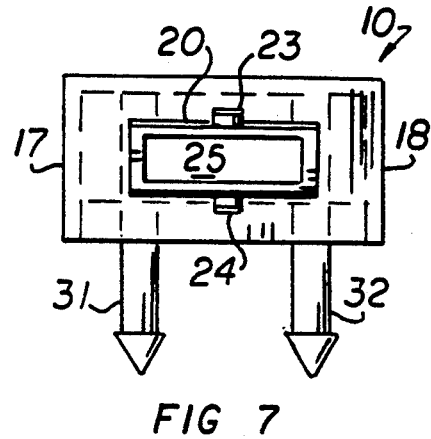
FIG. 7 is a right side elevational view thereof

Each block 10 is made of molded plastic as illustrated in FIGS. 3–7. Each block essentially consists of a rectangular polyhedron having the general dimensions and color of a standard construction brick approximately 20.4 centimeters (7 inches) long, 8.8 centimeters (3½ inches) wide, and 5.7 centimeters (2¼ inches) high; or of a closely similar oblong construction block. For aesthetical reasons, each block may be colored to preferably resemble a new or used brick. Each block 10 comprises a roof 14, a pair of parallel end-walls 15, 16, and a pair of side-walls 17, 18. The end-walls and the side-walls extend orthogonally and downward from the periphery of the roof 14 to define an interior chamber 19 having an open bottom.

A substantially rectangular interconnecting element 20 extends orthogonally and outwardly from the center of the right end-wall 15. The interconnecting element 20 has a vertical cross section which tapers down slightly from its root 21 on the face of the right side-wall to its distal end 22. A pair of aligned pins or nibs 23, 24 project upwardly and downwardly from the upper and lower surfaces of the interconnecting element. The center of the interconnecting element forms a hollow channel 25 in communication with the block internal chamber 19.

The left end-wall 16 has a rectangular cavity 26 which is shaped, positioned and dimensioned to engage over the interconnecting element 25 of an adjacent block. The height of the cavity 26 is substantially equivalent to the height of the interconnecting element 20 near its root 21. The width of the cavity 26 is slightly larger than the overall width of the interconnecting element 20. The internal upper surface 27 and lower surface 28 of the cavity 26 have aligned oblong windows 29 and 30 respectively which are sized and positioned to engage nibs 23, 24 of the adjacent block interconnecting element 20. Due to the rotational connection between the nibs 23, 24 and the windows 29, 30 respectively, the width of the windows 29 and 30 corresponding to approximately one third of the total width of the block 10, and the fact that the width of the cavity is larger than the width of the interconnecting element, two adjacent blocks can be connected in a hinged manner allowing horizontal arcuate movement of one block in relation to the other in order to create curved edging sections as illustrated in FIG. 1.

Rectangular washers 11 made of compressible material such as natural or synthetic rubber, natural or synthetic foam and elastomers are slipped over the interconnecting element 20 of each block to serve as a buffer, and simulate cement joints between the blocks 10.

Two prongs 31, 32 extend downwardly from the undersurface 33 of the roof beyond the lower edge 34 of the block. Each prong has a pointed and barbed distal section 35, 36. The prongs are used to anchor each block to the underlying supporting surface. That supporting surface may be a natural one such as turf or soil, some prepared aggregate or cementitious medium. Prongs 31, 32 are stabilized by two cross-bars 37, 38 spanning the two sidewalls 17, 18 near the lower edge 34 of the box and the midsections of the prongs.

FIG. 8 illustrates a block 39 which is traversed by a section of illuminating strip 40 of the type having bulbs 41 at regular intervals enclosed along with the wiring in a transparent tubing 42. The block 39 is preferably made of a translucent material, and a whole series of them can be strung like beads over the illuminating strip, passing through the channel 25 of the interconnecting element, internal chamber 19, and the cavity 26.

Figure 9:
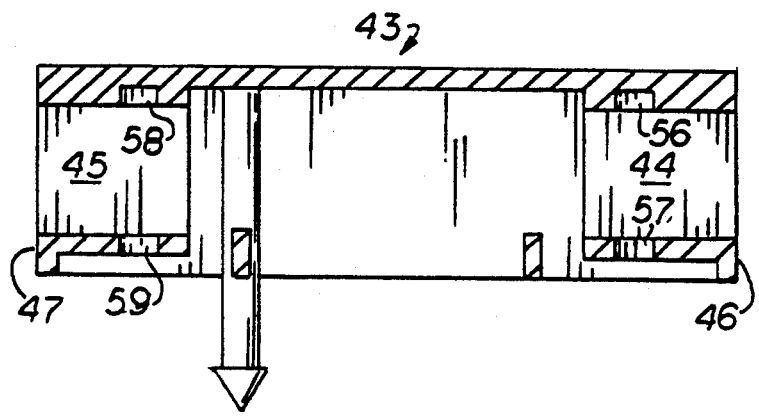
FIG. 9 is a cross-sectional view of an alternate embodiment of a block.
Figure 10:
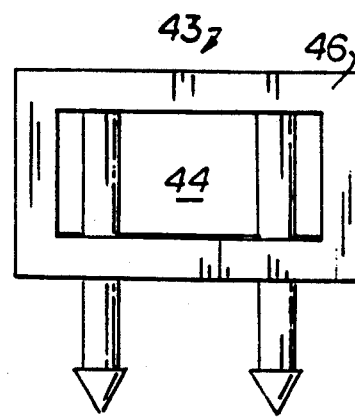
FIG. 10 is an end-view thereof.
Figure 11:
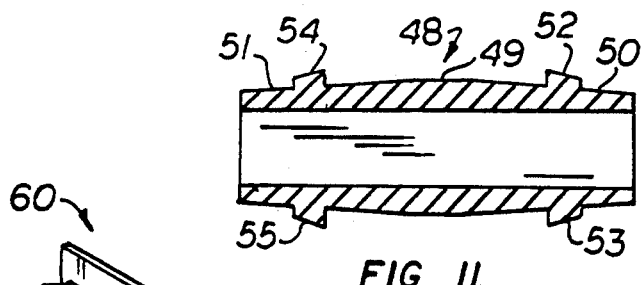
FIG. 11 is a cross-sectional view of an interlocking member.
Figure 12:
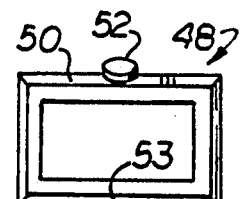
FIG. 12 is an end-view thereof.
Figure 13:
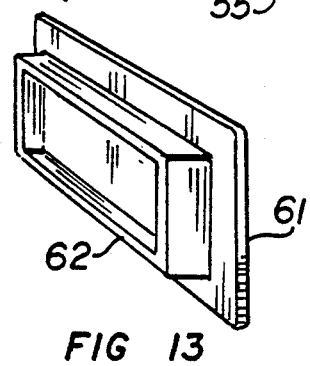
FIG. 13 is a perspective view of a end plug.

The alternate embodiment 43 of the block illustrated in FIGS. 9–13 is characterized by two symmetrical cavities 44, 45 in opposite end walls 46, 47. These cavities are substantially similar to the rectangular cavity 26 in the left wall of the first-described embodiment. A separate interlocking member 48 is used to hingedly join two of such blocks. The interlocking member 48 has a quadrangular central portion 49 and a pair of symmetrical, tapered projections 50, 51 extending in opposite axial directions from said central portion. Each of said projections is substantially similar to the interconnecting element 20 of the earlier-described embodiment. The vertically aligned pairs of nibs or stubs 52, 53 and 54, 55 that extend from the top and bottom surfaces of each projection are shaped, dimensioned and positioned to snap into the corresponding pairs of recesses 56, 57 and 58, 59 respectively of two adjacent blocks. The insertion of the projections 50, 51 into the cavities 44, 45 is facilitated by the outwardly tapering of the projections. It should be noted that the projections 50, 51 have a height substantially commensurate with the height of the cavities 44, 45, but a smaller width in order to allow limited rotation of the interconnecting element within the cavities about the vertical axes of the ribs and recesses.

An end cap 60 is provided to close the end wall of a last one of a series of interlocked blocks. The end cap has a cover 61 commensurate with the outer dimensions of the end walls 46, 47 and a plug 62 shaped and dimensioned to be forcedly engaged into the opening of either one of the cavities 44, 45.

While the preferred embodiments of the invention have been described, modifications can be made and other embodiments may be devised without departing from the spirit of the invention and the scope of the appended claims.

What is claimed is:

1. A block for use in combination with other symmetrical blocks in building edgings for flower beds, lawns and garden paths, which comprises:
    a rectangular top having substantially planar upper and lower surfaces;
    first and second end-walls, each end-wall having an inner face and an outer face;
    a pair of side-walls;
    said end-walls and side-walls extending downwardly and peripherally from said top to define an internal chamber;
    an interlocking member projecting outwardly from the outer face of the first end-wall;
    the second end-wall having a first cavity shaped and positioned to engage over a second of said interlocking members associated with a second of said blocks;
    means for hingedly securing said second interlocking member within said cavity, said means for securing being oriented and positioned, and said cavity being sized to allow limited lateral, arcuate movement of said second interlocking member within said first cavity; and,
    a rectangular slab of resilient, compressible material, said slab being commensurate with said end-wall and having a central channel sized and positioned to engage over said second interlocking member and form a compressible filler between two of said blocks.

2. The structure of claim 1, wherein said resilient material is selected from a group consisting of synthetic foams, natural foams, natural rubber and elastomers.

3. The structure of claim 1 which further comprises at least one anchoring prong extending downwardly beyond lower edges of said end-walls and side-walls into an underlying material supporting said block.

4. The structure of claim 3, wherein said prong comprises a barbed distal section.

5. The structure of claim 4, wherein said prong extends from the lower surface of said top.

6. The structure of claim 3, wherein said top, end-walls, side-walls, prong, and interlocking members are integrally molded out of plastic.

7. A block for use in combination with other symmetrical blocks in building edgings for flower beds, lawns and garden paths, which comprises:
    a rectangular top having substantially planar upper and lower surfaces;
    first and second end-walls, each end-wall having an inner face and an outer face; p1 a pair of side-walls;
    said end-walls and side-walls extending downwardly and peripherally from said top to define an internal chamber;
    an interlocking member projecting outwardly from the outer face of the first end-wall;
    the second end-wall having a first cavity shaped and positioned to engage over a second of said interlocking members associated with a second of said blocks;
    means for hingedly securing said second interlocking member within said cavity, said means for securing being oriented and positioned, and said cavity being sized to allow limited lateral, arcuate movement of said second interlocking member within said first cavity;
    wherein said means for hingedly securing comprises interlocking elements aligned about vertical axes;
    wherein said first end-wall has a second cavity symmetrical to said first cavity;
    said interlocking member is separable from said block and comprises a central portion and a pair of symmetrical projections extending in opposite axial directions from said central portion;
    wherein said interlocking elements further comprise:
        at least one vertical nib projecting vertically from each of said symmetrical projections, and
        each of said first and second cavities having a recess shaped, dimensioned and positioned to releasably nest one of said nibs;
    wherein each of said symmetrical projections and each of said cavities have a substantially quadrangular cross-section and substantially commensurate heights; and
    each of said projections has a width substantially shorter than the width of said cavities to allow limited rotational movement of one of said interlocking members within one of said cavities about one of said vertical axes when a stub associated with said projection is nested within a recess associated with said cavity.

8. A block for use in combination with other symmetrical blocks in building edgings for flower beds, lawns and garden paths, which comprises:
    a rectangular top having substantially horizontal and substantially planar upper surface;
    first and second substantially vertical end-walls, each end-wall having an inner face and an outer face;
    a pair of side-walls;
    said end-walls and side-walls extending downwardly and peripherally from said top to define an internal chamber;
    means for attaching said block to a substantially planar surface of a substrate wherein said rectangular top is held substantially parallel with said surface of said substrate;

said first end-wall having a first cavity;

said second end-wall having a second cavity;

an interlocking member, separable from said block;

said interlocking member comprising:

a rigid oblong body having first and second ends, said first end sized and dimensioned to allow lateral penetration into said first cavity, and said second end sized and dimensioned to allow lateral penetration into said second cavity;

first internal means for hingedly securing said first end within said first cavity;

second internal means for hingedly securing said second end within said second cavity; and, said first and second internal means for securing being oriented and positioned, and said first and second cavity being sized to allow arcuate movement of said interlocking member within either of said cavities, said arcuate movement being substantially within a plane parallel to said rectangular top.

9. The structure of claim 8, wherein first and second ends extend in opposite axial directions, said cavities are symmetric with each other and said ends of said interlocking member are symmetric with each other.

10. The structure of claim 9, wherein said interlocking member further comprises:

at least one vertical nib projecting vertically from each of said ends; and each of said first and second cavities having a recess shaped, dimensioned and positioned to releasably nest one of said 11. The structure of claim 9, wherein said interlocking member comprises resilient material to facilitate penetration of an end of said interlocking member into a cavity in said block.

12. The structure of claim 8, which further comprises an end cap which comprises:

a cover having substantially planar inner and outer surfaces substantially parallel to one another, said outer surface sized and dimensioned to be commensurate with the outer dimensions of said first end-wall; and a plug sized and dimensioned to tightly engage said first cavity, said plug projecting from said inner surface of said cover.

* * * * *